(12) United States Patent
Hirose et al.

(10) Patent No.: US 8,817,583 B2
(45) Date of Patent: Aug. 26, 2014

(54) OPTICAL READ/WRITE APPARATUS

(75) Inventors: Ryoji Hirose, Osaka (JP); Harumitsu Miyashita, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/880,359

(22) PCT Filed: Aug. 31, 2012

(86) PCT No.: PCT/JP2012/005523
§ 371 (c)(1),
(2), (4) Date: Apr. 18, 2013

(87) PCT Pub. No.: WO2013/088602
PCT Pub. Date: Jun. 20, 2013

(65) Prior Publication Data
US 2014/0003211 A1    Jan. 2, 2014

(30) Foreign Application Priority Data

Dec. 13, 2011    (JP) ................................ 2011-271904

(51) Int. Cl.
*G11B 27/36* (2006.01)
*G11B 7/0045* (2006.01)
(52) U.S. Cl.
CPC .................................. *G11B 7/00458* (2013.01)
USPC ..................................................... 369/53.36
(58) Field of Classification Search
USPC ....................... 369/44.37, 44.38, 53.35, 53.36
See application file for complete search history.

(56) References Cited

U.S. PATENT DOCUMENTS

| 5,126,994 | A | 6/1992 | Ogawa et al. |
| 6,483,797 | B1 * | 11/2002 | Oakley et al. ............ 369/112.01 |
| 2003/0107642 | A1 | 6/2003 | Nagano |
| 2008/0192598 | A1 * | 8/2008 | Jayaraman et al. ........ 369/47.39 |

FOREIGN PATENT DOCUMENTS

| JP | 05-135364 A | 6/1993 |
| JP | 08-227527 A | 9/1996 |
| JP | 2003-178451 A | 6/2003 |
| JP | 2004-192671 A | 7/2004 |
| JP | 2006-012343 A | 1/2006 |

(Continued)

OTHER PUBLICATIONS

International Search Report for corresponding International Application No. PCT/JP2012/005523 mailed Nov. 20, 2012.

(Continued)

*Primary Examiner* — Brenda Bernardi
(74) *Attorney, Agent, or Firm* — Renner, Otto, Boisselle & Sklar, LLP

(57) ABSTRACT

An optical read/write apparatus according to an embodiment includes: an optical head unit (2a, 2b) which focuses a write light beam and a read light beam onto an optical storage medium (100) and which generates a signal based on the light beam that has been reflected from the optical storage medium; and a control section (6) which controls the optical head unit (2a, 2b) so that the optical head unit records a mark on the optical storage medium by irradiating the optical storage medium with the write light beam and reads the recorded mark on the optical storage medium with the read light beam. After having started to record the mark on the optical storage medium by irradiating the optical storage medium with the write light beam and before forming the recorded mark completely, the optical head unit (2a, 2b) reads the recorded mark on the optical storage medium with the read light beam.

14 Claims, 15 Drawing Sheets

(56) References Cited

FOREIGN PATENT DOCUMENTS

| JP | 2007-080407 A | | 3/2007 |
|---|---|---|---|
| JP | 2007080407 A | * | 3/2007 |
| JP | 2011-141936 A | | 7/2011 |

OTHER PUBLICATIONS

Form PCT/ISA/237 for corresponding International Application No. PCT/JP2012/005523 mailed Nov. 20, 2012.

* cited by examiner

OPTICAL READ/WRITE APPARATUS

TECHNICAL FIELD

The present disclosure relates to an optical read/write apparatus which reads, writes or erases data from/on an optical storage medium and more particularly relates to an optical read/write apparatus which performs a verify operation while writing data.

BACKGROUND ART

Nowadays, so-called "crowd computing" technologies are provided to allow people to use various kinds of services via servers and storage systems on some network. According to such crowd computing technologies, as a lot of users store various kinds of data on that storage system on the network, the amount of data accumulated there should keep on skyrocketing from now on. Meanwhile, to preserve such a huge amount of data stored, it should also be increasingly important to devise a method for saving that enormous amount of data as securely and as reliably as possible. And as such a huge amount of data should now be stored on the network with as much reliability as possible, an optical read/write apparatus to be used as such a storage system is required to verify the data that the apparatus is writing.

An optical read/write apparatus which performs a write operation and a verify operation using one, two or more optical heads (or optical pickups) is disclosed in Patent Document No. 1, for example. A technique for performing a write operation and a read operation for verification purposes in parallel is called a "DRAW (direct read after write)" technique.

According to the conventional verification method, when data that has been written on a storage medium is read in a predetermined unit, the decision is made whether the frequency of errors that have occurred in the data yet to be subjected to "error correction" is equal to or greater than a predetermined reference value or not. If a mark that has been recorded on a storage medium has an inappropriate shape, a read error will occur. If the frequency of occurrence of such read errors is sufficiently low, the data represented by those recorded marks can still be restored by error correction and can be read as intended. However, if the frequency of occurrence of such read errors is too high, the data cannot be restored and read properly even when subjected to the error correction. Thus, if the frequency of occurrence of read errors during a verify operation is equal to or greater than a reference value, the decision is made that that data should be rewritten.

CITATION LIST

Patent Literature

Patent Document No. 1: Japanese Laid-Open Patent Publication No. 2007-80407

SUMMARY OF INVENTION

Technical Problem

The present disclosure provides an optical read/write apparatus that can perform a verify operation in a shorter time after a write operation has been started.

Solution to Problem

An optical read/write apparatus according to the present disclosure includes: an optical head unit which focuses a write light beam and a read light beam onto an optical storage medium and which generates a signal based on the light beam that has been reflected from the optical storage medium; and a control section which controls the optical head unit so that the optical head unit records a mark on the optical storage medium by irradiating the optical storage medium with the write light beam and reads the recorded mark on the optical storage medium with the read light beam. After having started to record the mark on the optical storage medium by irradiating the optical storage medium with the write light beam and before forming the recorded mark completely, the optical head unit reads the recorded mark on the optical storage medium with the read light beam.

Advantageous Effects of Invention

An optical read/write apparatus according to the present disclosure can perform a verify operation in a shorter time after a write operation has been started.

BRIEF DESCRIPTION OF DRAWINGS

[FIG. 15] Illustrates the relative arrangement of respective optical heads 2a, 2b, 2b' and 2b'' with respect to tracks on the optical disc 100 in a situation where the optical heads 2b, 2b' and 2b'' are located at the same physical distance from the optical head 2a.

DESCRIPTION OF EMBODIMENTS

Figure 1:
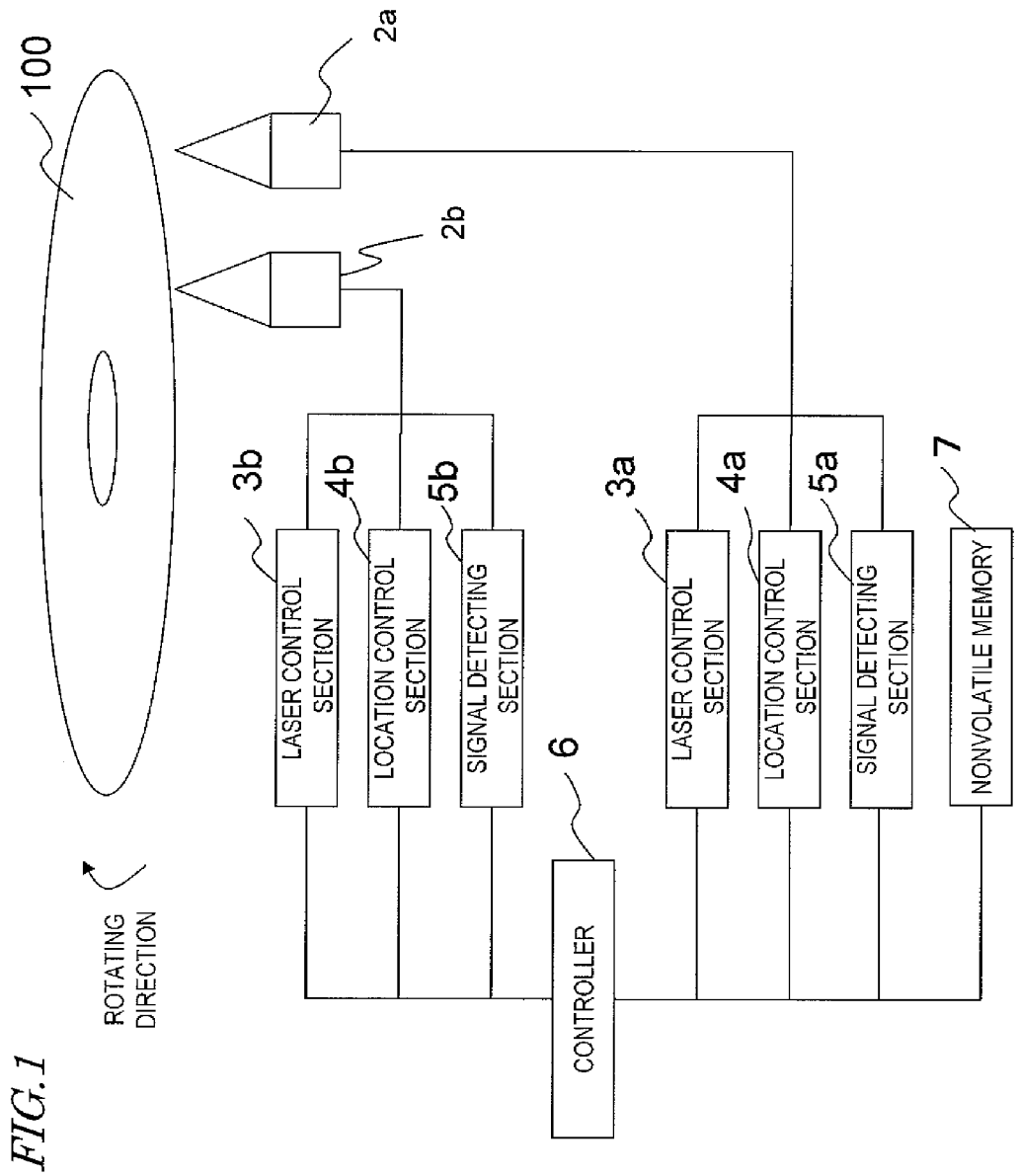
[FIG. 1] Illustrates a configuration for an optical read/write apparatus according to an embodiment.

Data stored on an optical storage medium such as an optical disc or an optical tape can be read by irradiating the optical storage medium rotating or running with a relatively weak light beam with a constant intensity and by detecting the light that has been reflected from the optical storage medium. On a read-only optical disc, for example, information is already stored as pits that are arranged spirally during the manufacturing process of the optical disc. On the other hand, on a rewritable optical disc, a recording material film, from/on which data can be read and written optically, is deposited by evaporation process, for example, on the surface of a base member on which tracks with spiral lands or grooves are arranged. In writing data on a rewritable optical disc, data is written there by irradiating the optical disc with a light beam, of which the optical power has been changed according to the data to be written, and locally changing the properties (including the refractive index and reflectance) of the recording material film.

When data is going to be written on the recording material film, the recording material film is irradiated with such a light beam, of which the optical power has been modulated as described above, thereby recording an amorphous mark on a crystalline recording material film. Such an amorphous recorded mark is left there by heating a portion of the recording material film that has been irradiated with a write light beam to a temperature that is equal to or higher than its melting point and then rapidly cooling that portion. If the optical power of a light beam that irradiates the recorded mark is set to be relatively low, the temperature of the recorded mark being irradiated with the light beam does not exceed its melting point and the recorded mark will turn crystalline again after having been cooled rapidly (i.e., the recorded mark will be erased). In this manner, the recorded mark can be rewritten over and over again. However, if the power of the light beam for writing data had an inappropriate level, then the recorded mark would have a deformed shape and sometimes it could be difficult to read the data as intended.

To read or write data from/on an optical storage medium, the light beam needs to maintain a predetermined converging state on a target track. For that purpose, a "focus control" and a "tracking control" are performed. The "focus control" means controlling the position of an objective lens perpendicularly to the surface of the optical storage medium so that the focal point (or at least the converging point) of the light beam is always located on the target track. On the other hand, the "tracking control" means controlling the position of the objective lens parallel to the surface of the optical storage medium and perpendicularly to the track so that the light beam spot is located right on the target track.

In order to perform such a focus control or a tracking control, the focus error or the tracking error needs to be detected based on the light that has been reflected from the optical storage medium and the position of the light beam spot needs to be adjusted so as to reduce the error as much as possible. The magnitudes of the focus error and the tracking error are respectively represented by a "focus error (FE) signal" and a "tracking error (TE) signal", both of which are generated based on the light that has been reflected from the optical storage medium.

It should be noted that the depth of the pits and tracks and the thickness of the recording material film are both smaller than the thickness of the base member of the optical storage medium. For that reason, those portions of the optical storage medium, where data is stored, define a two-dimensional plane, which is sometimes called a "storage plane" or an "information plane".

The optical storage medium includes at least one such information layer. Actually, however, a single information layer may include multiple layers such as a phase change material layer and a reflective layer.

To read data from an optical storage medium and/or to write data on the optical storage medium, an optical read/write apparatus with an optical head is used. The optical head includes a light source which emits a light beam, an objective lens which makes the light beam that has been emitted from the light source converge onto the optical storage medium, and a photodetector which measures the intensity of the light reflected from the optical storage medium being irradiated with the light beam.

After the recording material film has been irradiated with light to record a mark on it, the optical properties (including the refractive index and reflectance), shape and size of the recorded mark on the recording material film will change with time. As described above, its optical properties change while the recording material film that has been heated to a high temperature by being irradiated with the light gets cooled naturally. The amount of time it takes for all of these changes to settle and for the recorded mark to get stabilized varies according to the type of the optical storage medium, and may be longer than a few seconds in some cases. As long as the recorded mark is not stabilized, even if a verify operation was performed, the expected result would not be obtained. That is why in the related art, the verify operation (i.e., scanning the recorded mark) is not performed until the recorded mark gets stabilized sufficiently.

To perform a verify operation after that amount of time for a mark recorded to get stabilized sufficiently has passed, the distance between an optical head for reading and an optical head for writing may be set so that the optical head for reading does not start a read operation until plenty of time has passed since the optical head for writing irradiated the mark with light.

Figure 14:
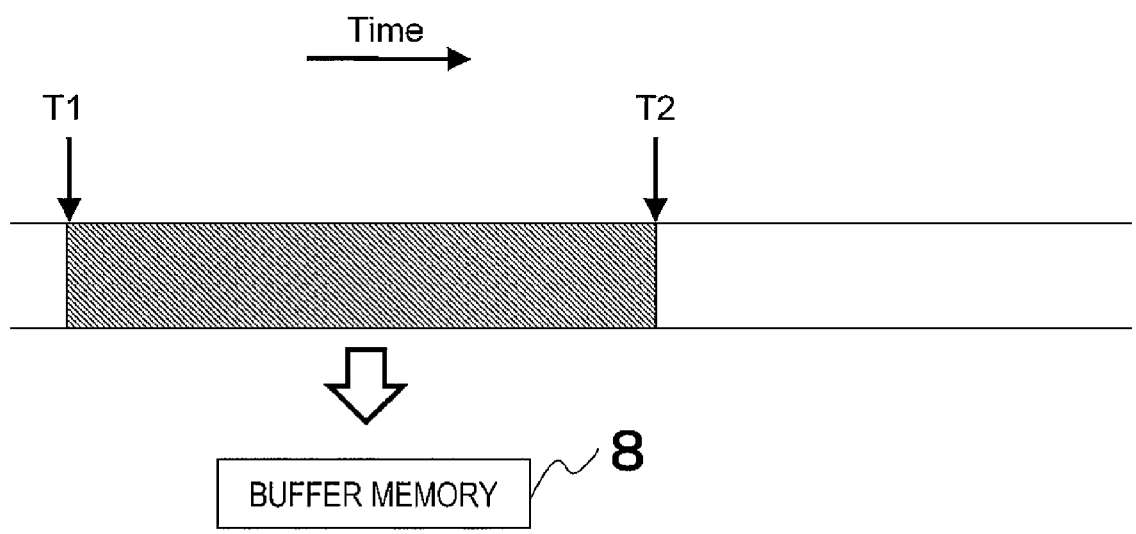
[FIG. 14] Illustrates a buffer memory 8 and the quantity of data to be stored in the buffer memory 8.

However, the longer the distance between those optical heads for writing and reading, the larger the size of data to be written on the optical storage medium since the write operation ended and until the read operation for verification purposes is started. Depending on the result of the verify operation, such data should be rewritten on the optical storage medium. For that reason, the optical read/write apparatus includes a buffer memory 8 as shown in FIG. 14 and is required to temporarily retain the data in that buffer memory 8 until the verify operation gets done. FIG. 14 schematically illustrates the quantity of the data to be written on the optical storage medium in the period that begins with the time T1 when a mark starts to be recorded and ends with the time T2 when the verify operation is performed. If the period from the mark recording start time T1 through the verification time T2 was long, the quantity of data to be retained in the buffer memory 8 could be enormous.

In some storage media, it could take as long as a few seconds to get the recorded mark stabilized. People took it for granted that if such an optical storage medium might be used, the period from the mark recording start time T1 through the verification time T2 should always be set to be long irrespective of the type of the optical storage medium loaded. In that case, however, even if the recorded mark could actually be stabilized in a short time on the optical storage medium loaded, a lot of data would be retained in the buffer memory 8 in vain and it would take a long time to get ready for the verify operation. In addition, in a situation where the period from the mark recording start time T1 through the verification time T2 is long, even if data has been written under an inappropriate condition (e.g., in terms of the power of the write light beam), the write operation could be continued without modifying the writing condition for a long time. If the data writing condition (e.g., the power of the write light beam) were fixed, the quality of the recorded mark could be debased while user data is being written on the optical storage medium. For example, the power of the write light beam could have different optimum values between a location close to the center of an optical disc and a location close to the periphery of the optical disc. That is why if data continued to be written for a long time with the power of the write light beam set to be constant, the recorded mark could deteriorate in the course of that long write operation. However, if the period from the mark recording start time T1 through the verification time T2 was long, it would take a longer time to detect such deterioration of the recorded mark, which is a problem.

The present inventors discovered that even before a recorded mark gets stabilized, the verify operation can still be performed by reading the recorded mark. According to an embodiment of the present disclosure, the inconveniences described above can be avoided by reading a recorded mark with a read light beam before the recorded mark is formed completely.

An optical read/write apparatus according to the present disclosure includes: an optical head unit which focuses a write light beam and a read light beam onto an optical storage medium and which generates a signal based on the light beam that has been reflected from the optical storage medium; and a control section which controls the optical head unit so that the optical head unit records a mark on the optical storage medium by irradiating the optical storage medium with the write light beam and reads the recorded mark on the optical storage medium with the read light beam. After having started to record the mark on the optical storage medium by irradiating the optical storage medium with the write light beam and before forming the recorded mark completely, the optical head unit reads the recorded mark on the optical storage medium with the read light beam.

In one embodiment, the optical head unit includes a first optical head which emits the write light beam and a second optical head which emits the read light beam.

In one embodiment, the control section controls the positions of the first and second optical heads so that the relative arrangement of the first and second optical heads is changeable.

In one embodiment, the control section changes the relative arrangement of the first and second optical heads so that an interval between a start of recording the mark on the optical storage medium by the first optical head and a readout of the recorded mark by the second optical head is changed according to an environmental temperature or the type of the optical storage medium.

In one embodiment, the optical read/write apparatus includes a memory that stores information defining the relative arrangement of the first and second optical heads.

In one embodiment, the information defining the relative arrangement is information that indicates correspondence between the relative arrangement, the environmental temperature and the type of the optical storage medium.

In one embodiment, the control section determines the relative arrangement of the first and second optical heads by the index value of a detection signal to be obtained by getting the recorded mark on the optical storage medium read by the second optical head.

In one embodiment, the index value of the detection signal is a jitter value, an asymmetry value, a β value, iMLSE or the degree of modulation, and the control section determines the relative arrangement of the first and second optical heads so that the index value reaches a preset value.

In one embodiment, the control section changes the relative arrangement of the first and second optical heads according to the index value of the detection signal after user data has started to be written.

In one embodiment, the control section determines the relative arrangement of the first and second optical heads before user data starts to be written.

In one embodiment, the optical head unit includes another optical head.

In one embodiment, the control section has a mechanism that moves the first and second optical heads independently of each other.

In one embodiment, the relative arrangement of the first and second optical heads is fixed.

In one embodiment, the optical head unit includes a light source which emits light, and an optical element which splits the light that has been emitted from the light source into multiple light beams including the write light beam and the read light beam.

Hereinafter, embodiments will be described with reference to the accompanying drawings as needed. It should be noted that the description thereof will be sometimes omitted unless it is absolutely necessary to go into details. For example, description of a matter that is already well known in the related art will be sometimes omitted, so will be a redundant description of substantially the same configuration. This is done solely for the purpose of avoiding redundancies and making the following description of embodiments as easily understandable for those skilled in the art as possible.

It should be noted that the present inventors provide the accompanying drawings and the following description to help those skilled in the art understand the present disclosure fully. And it is not intended that the subject matter defined by the appended claims is limited by those drawings or the description.

(Embodiments)

Hereinafter, an optical read/write apparatus as an embodiment will be described. In the following description, the optical storage medium is supposed to be an optical disc.

<1-1. Configuration>

FIG. 1 illustrates a configuration for an optical read/write apparatus according to an embodiment. As shown in FIG. 1, the optical read/write apparatus of this embodiment includes two optical heads 2a and 2b as an optical head unit for optically accessing an optical disc 100. The optical head 2a may be used for writing and the optical head 2b may be used for reading. Just like a known optical head, each of these optical heads 2a and 2b includes a light source which emits a light beam, an objective lens which converges the light beam that has been emitted from the light source onto an optical storage medium, and a photodetector which measures the intensity of the light that has been reflected from the optical storage medium being irradiated with the light beam. If these two optical heads 2a and 2b have the same configuration, any one of the two may be used for writing and the other for reading. Optionally, some of multiple optical heads may be used as a read-only one. In that case, the read-only optical head does not need a high-power light source which can produce a light beam with power that is high enough to write data.

In this description, the terms "for writing" and "for reading" are used with respect to a DRAW (direct read after write) operation to be carried out in a "write mode". In a "read mode" in which the user data that has already been written on an optical storage medium is read, the DRAW operation is not performed. That is why in the "read mode", arbitrary one(s), or even all, of the multiple optical heads may be used for reading.

In this embodiment, the optical heads 2a and 2b may move independently of each other in either or both of the "track direction" and "track crossing direction" on an optical storage medium (e.g., the optical disc 100). Specifically, these optical heads 2a and 2b are supported by a head moving mechanism that can change the positions of the optical heads 2a and 2b independently of each other. Such a head moving mechanism may be implemented as an optical head traverse unit adopted in a known optical disc drive, for example. The optical head traverse unit can move an optical head in a radial direction on an optical disc using a motor. If those two optical heads 2a and 2b are mounted on the two moving portions of a traverse unit, the positions of the heads 2a and 2b in the radial direction on the optical disc can be changed independently of each other.

An optical read/write apparatus according to this embodiment includes two laser control sections 3a and 3b, two location control sections 4a and 4b and two signal detecting sections 5a and 5b which respectively perform a laser control, a position control and signal detection on the optical heads 2a and 2b independently of each other. The optical read/write apparatus further includes a controller 6 which controls these laser control sections 3a, 3b, location control sections 4a, 4b and signal detecting sections 5a, 5b. The controller 6 can determine the relation between the distance from the write optical head 2a to the read optical head 2b and the threshold value of a verify decision. The optical read/write apparatus of this embodiment further includes a nonvolatile memory 7 which stores information to set the verify decision threshold value based on the distance between the heads, the type of the optical storage medium and other factors.

Figure 2:
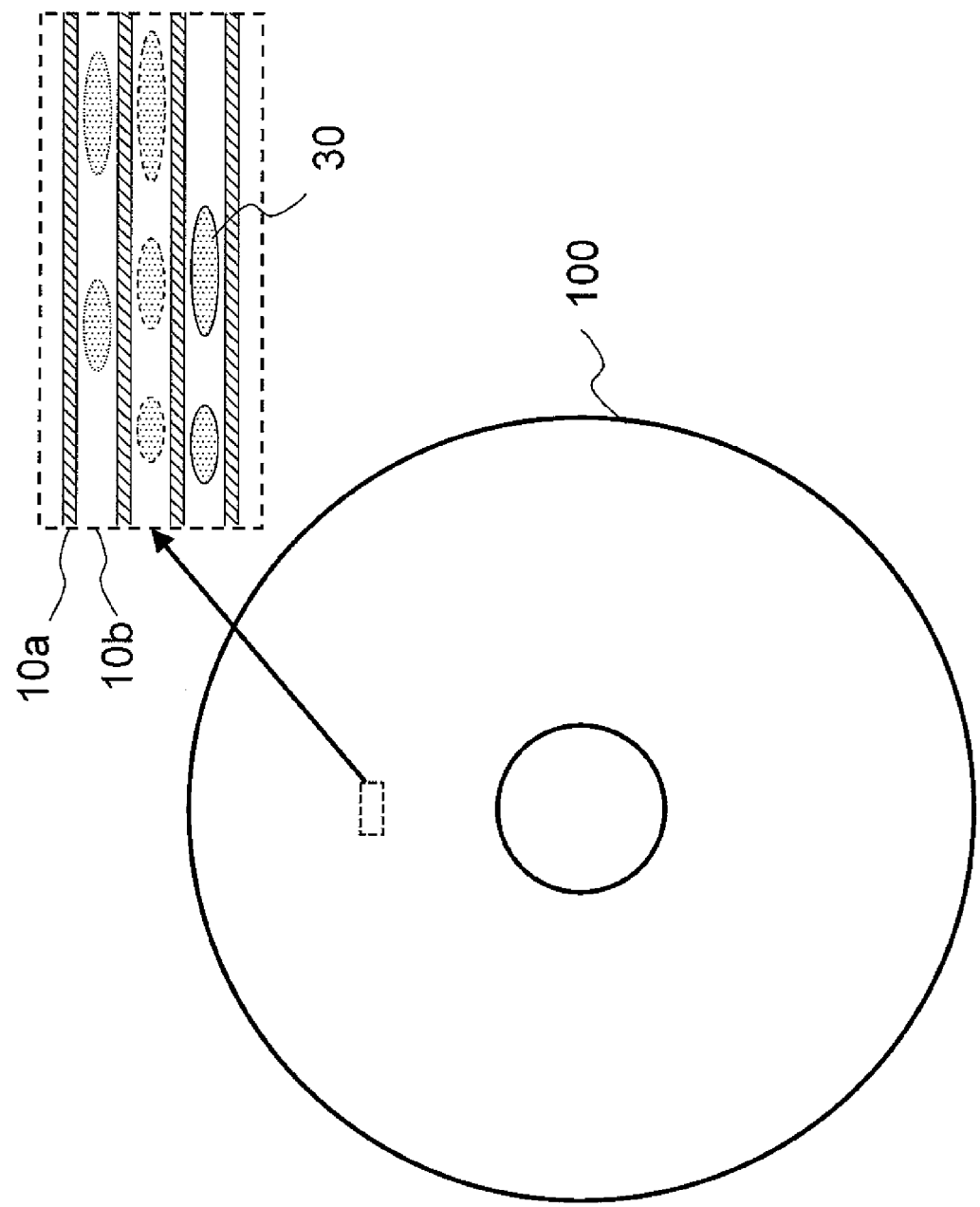
[FIG. 2] Schematically illustrates the optical disc 100 and its portion (surrounded with a dashed line) on a larger scale.

FIG. 2 schematically illustrates the optical disc 100 and its portion (surrounded with a dashed line) on a larger scale. The optical disc 100 has spiral or concentric tracks. On the optical disc 100 shown in FIG. 2, arranged are lands 10a and grooves 10b, and data is written on the grooves 10b. Also illustrated schematically in FIG. 2 are marks 30 that have been recorded on the optical disc 100.

Figure 3:
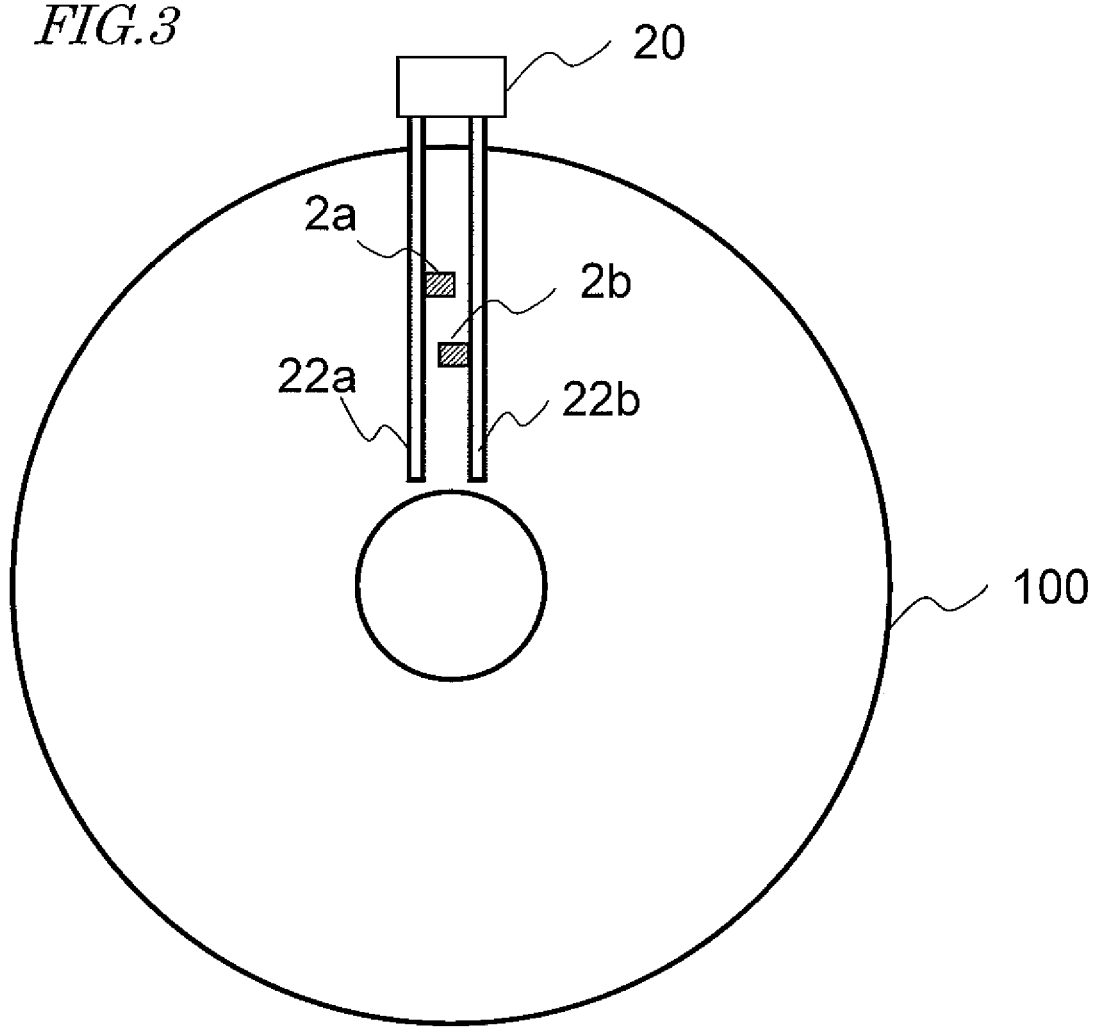
[FIG. 3] Illustrates an example of a traverse unit 20.

FIG. 3 illustrates an example of a traverse unit 20 which can move the two optical heads 2a and 2b independently of each other. Specifically, the optical head 2a is driven along the guide 22a of the traverse unit 20 to move in the radial direction on the optical disc 100. On the other hand, the optical head 2b is driven along the guide 22b of the traverse unit 20 to move in the radial direction on the optical disc 100.

Figure 4:
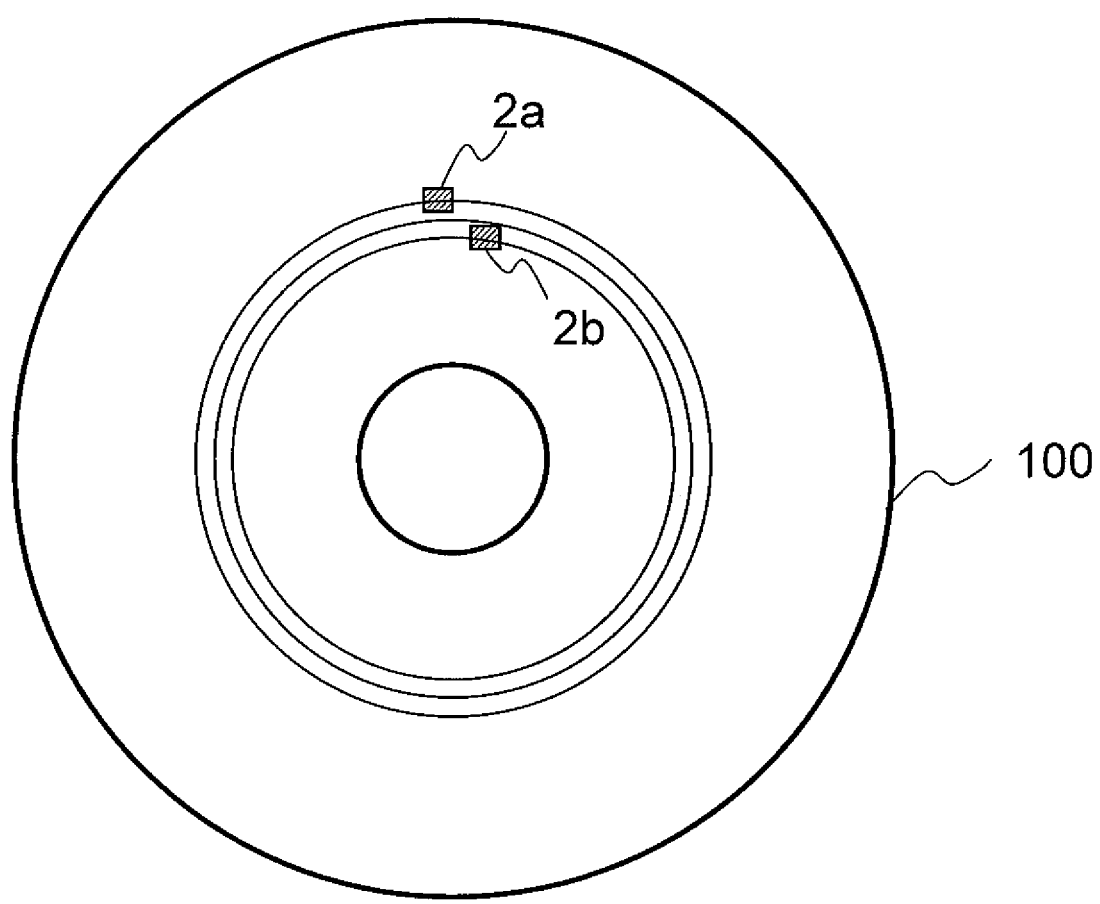
[FIG. 4] Illustrates the relative arrangement of optical heads 2a and 2b with respect to tracks on the optical disc 100.

FIG. 4 illustrates the relative arrangement of the optical heads 2a and 2b with respect to tracks on the optical disc 100 with illustration of the traverse unit 20 omitted. In the example illustrated in FIG. 4, the optical head 2a is located closer to the outer edge of the optical disc 100 than the optical head 2b is. In other words, the track irradiated with the write light beam by the optical head 2a is located outside of the track irradiated with the read light beam by the optical head 2b. In this example, the optical head 2a begins to write data on the optical disc 100 with its innermost track. And as the optical disc 100 rotates, the optical head 2a moves outward to scan the tracks one by one, thereby changing target tracks to write data on one after another from the innermost track toward the outermost one. Meanwhile, the optical head 2b scans the track on which data has just been written by the optical head 2a shortly after the optical head 2a left. In the example illustrated in FIG. 4, the optical head 2b is located two tracks inside of the optical head 2a. In other words, the optical head 2b is scanning this optical disc 100 two turns behind the optical head 2a.

Figure 5A:
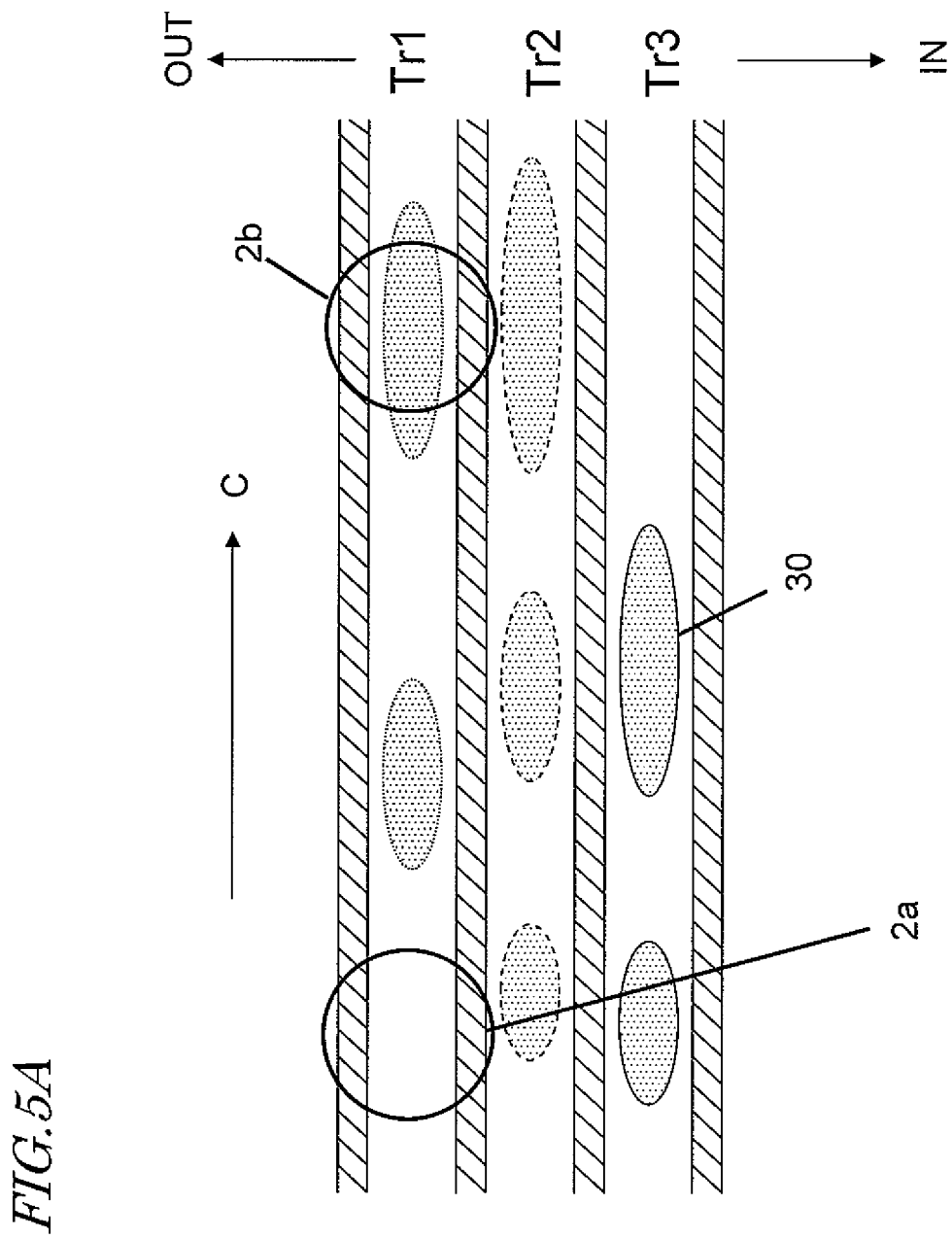
[FIG. 5A] Illustrates an exemplary relative arrangement of the optical heads 2a and 2b on a larger scale.
Figure 5B:
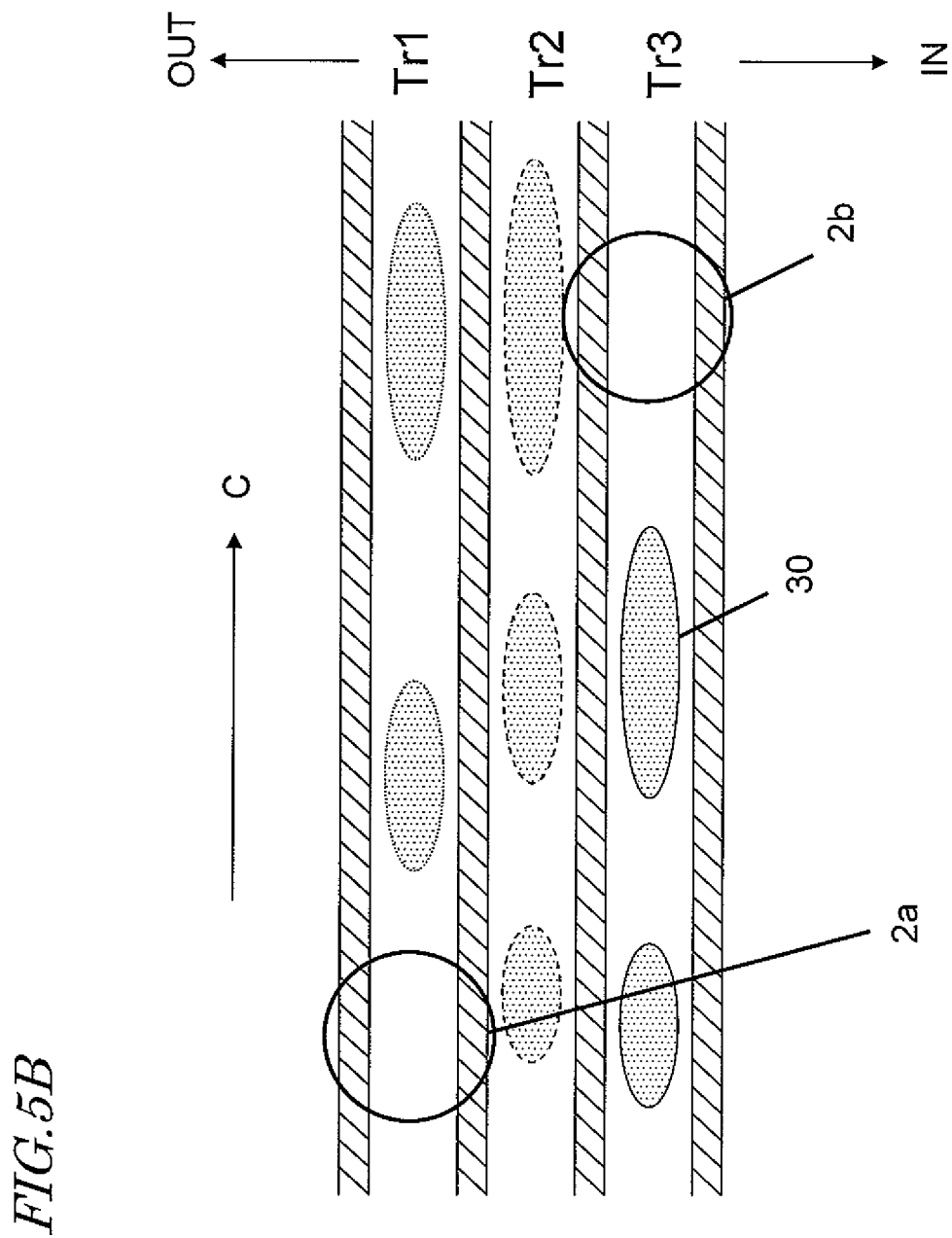
[FIG. 5B] Illustrates another exemplary relative arrangement of the optical heads 2a and 2b on a larger scale.

FIGS. 5A and 5B illustrate an exemplary relative arrangement of the optical heads 2a and 2b on a larger scale. In the example illustrated in FIG. 5A, these two optical heads 2a and 2b are currently located on the same track Tr1. The optical disc is rotating in the directions indicated by the arrow C. On the other hand, in the example illustrated in FIG. 5B, the optical head 2a is currently located on the outer track Tr1 (as indicated by "OUT"), while the optical head 2b is currently located on the inner track Tr3 (as indicated by "IN"). When the optical disc 100 turns once, the optical head 2b will change tracks to the next one Tr2. And when the optical disc 100 turns once more, the optical head 2b will change tracks to the next one Tr1.

Figure 6:
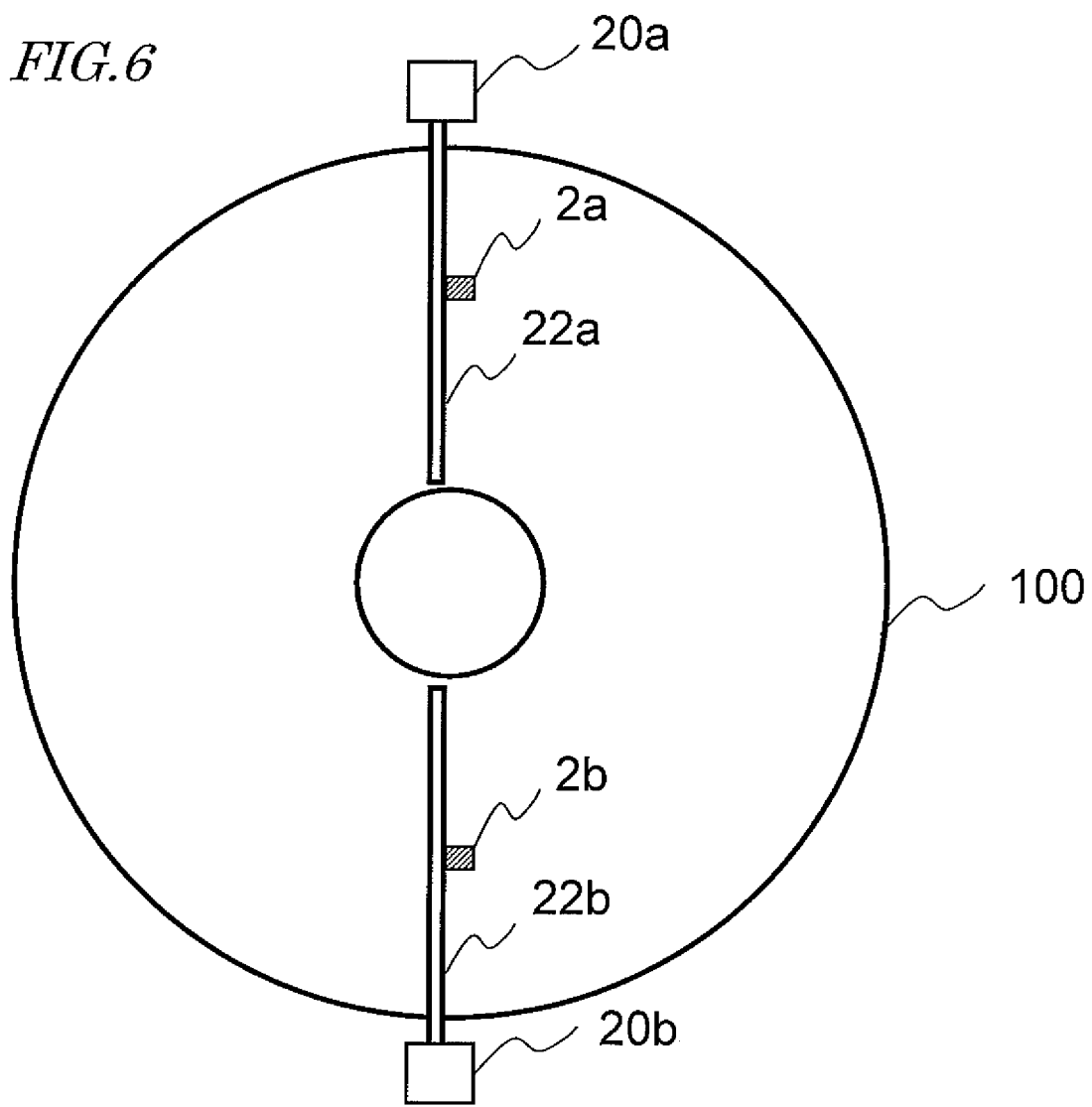
[FIG. 6] Illustrates another example of traverse units.

FIG. 6 illustrates another example of traverse units which can also move the two optical heads 2a and 2b independently of each other. In this example, two traverse units 20a and 20b are arranged separately from each other so as to define an angle of 180 degrees with respect to the center of rotation of the optical disc 100. The optical head 2a is driven along the guide 22a of the traverse unit 20a to move in the radial direction on the optical disc 100. On the other hand, the optical head 2b is driven along the guide 22b of the traverse unit 20b to move in the radial direction on the optical disc 100.

Figure 7:
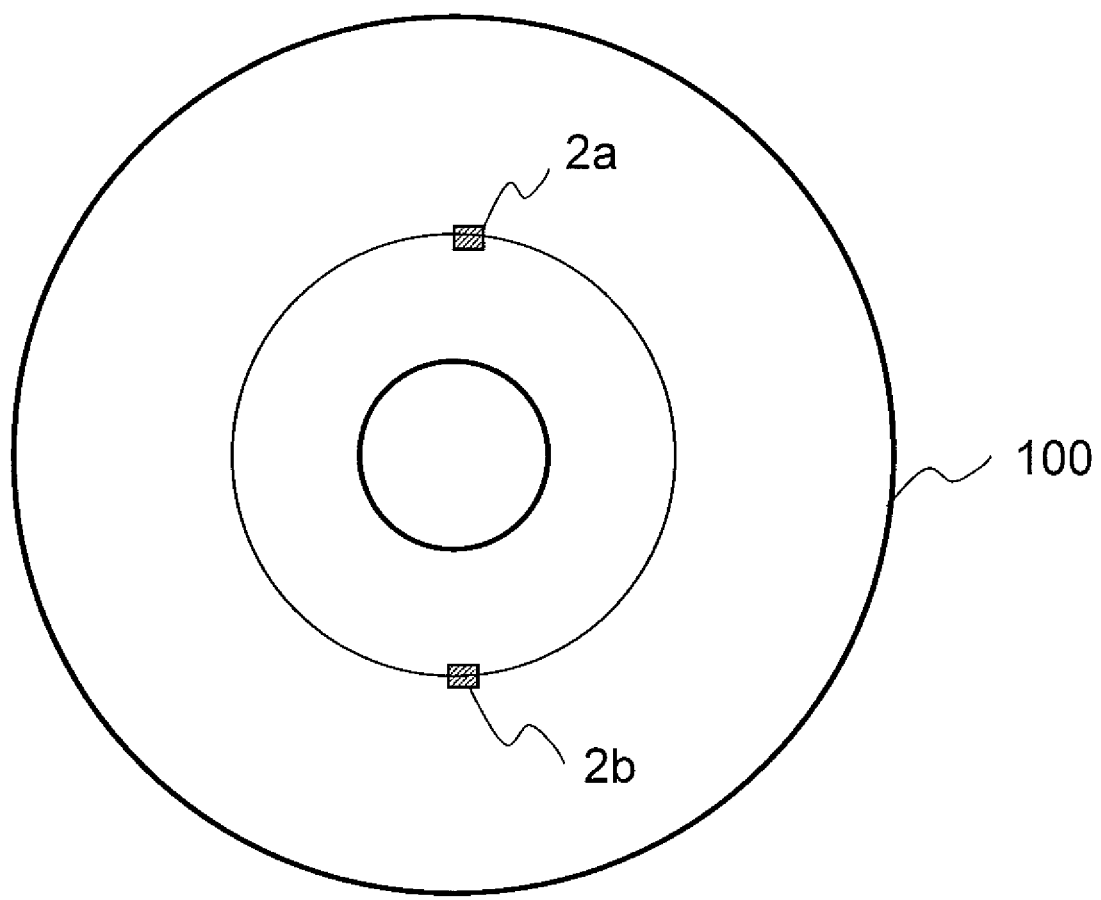
[FIG. 7] Illustrates an exemplary relative arrangement of the optical heads 2a and 2b with respect to tracks on the optical disc 100.

FIG. 7 illustrates an exemplary relative arrangement of the optical heads 2a and 2b with respect to tracks on the optical disc 100 with illustration of the traverse units 20a and 20b omitted. In the example illustrated in FIG. 7, the optical heads 2a and 2b are currently located on the same track on the optical disc 100. The optical head 2b scans the track on which data has just been written by the optical head 2a a half round after the optical head 2a left.

Figure 8:
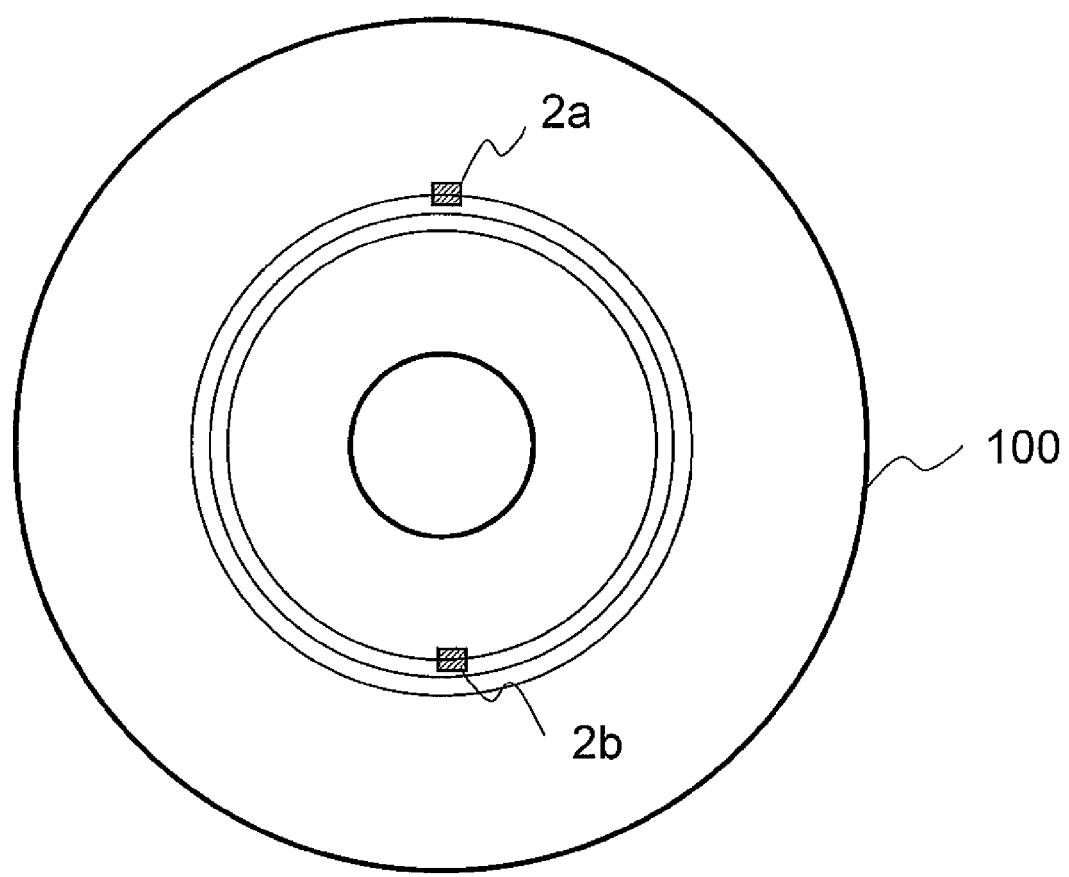
[FIG. 8] Illustrates another exemplary relative arrangement of the optical heads 2a and 2b with respect to tracks on the optical disc 100.

FIG. 8 illustrates another exemplary relative arrangement of the optical heads 2a and 2b with respect to tracks on the optical disc 100. In this example, the optical head 2b is located two tracks inside of the optical head 2a. In other words, the optical head 2b is scanning this optical disc 100 two and a half turns behind the optical head 2a.

In the exemplary relative arrangement shown in FIG. 4, the optical head, 2a is moving ahead of the optical head 2b by an angle of approximately 720 degrees (=approximately 2×360 degrees) with respect to the center of rotation of the optical disc 100. In the exemplary relative arrangement shown in FIG. 7, the optical head 2a is moving ahead of the optical head 2b by an angle of 180 degrees. And in the exemplary relative arrangement shown in FIG. 8, the optical head 2a is moving ahead of the optical head 2b by an angle of approximately 900 degrees (=approximately 2.5×360 degrees). However, the optical head 2a moving ahead of the optical head 2b may define any arbitrary angle. In other words, the angle defined by the respective guides 22a and 22b of the two traverse units 20a and 20b shown in FIG. 6 does not have to be 0 or 180 degrees but may also be any other value.

Figure 15:
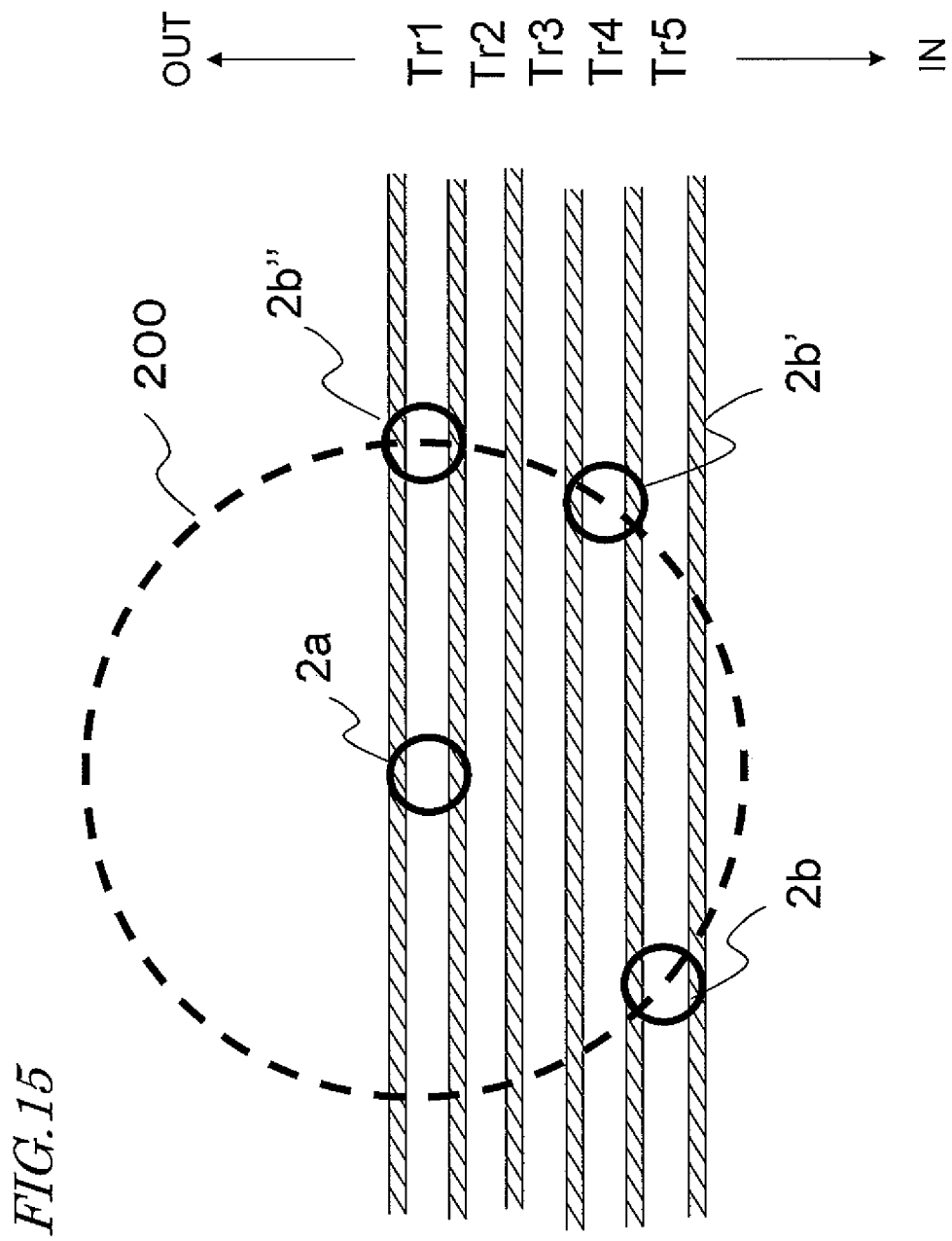

In this description, the "distance" between two heads refers herein to the distance as measured along tracks on an optical storage medium. In other words, the "distance" means the distance over which the light beam spot left by write optical head 2a has traveled on the optical disc since a mark started to be recorded by the write optical head 2a and until that recorded mark is read by the read optical head 2b. This "distance" changes if the relative arrangement of the write and read optical heads 2a and 2b is changed. For example, supposing the read optical head 2b is arranged behind the write optical head 2a so as to be located on the circumference of a circle drawn around the write optical head 2a as shown in FIG. 15, even if the physical distance is the same between the heads 2a and 2b, between the heads 2a and 2b' and between the heads 2a and 2b'', the head-to-head distances are different. That is to say, even if the physical distance between the write optical head 2a and the read optical head 2b is constant, the head-to-head distance can also be changed just by changing their relative arrangement.

Next, an exemplary circuit configuration for an optical read/write apparatus according to this embodiment will be described with reference to FIG. 9.

Figure 9:
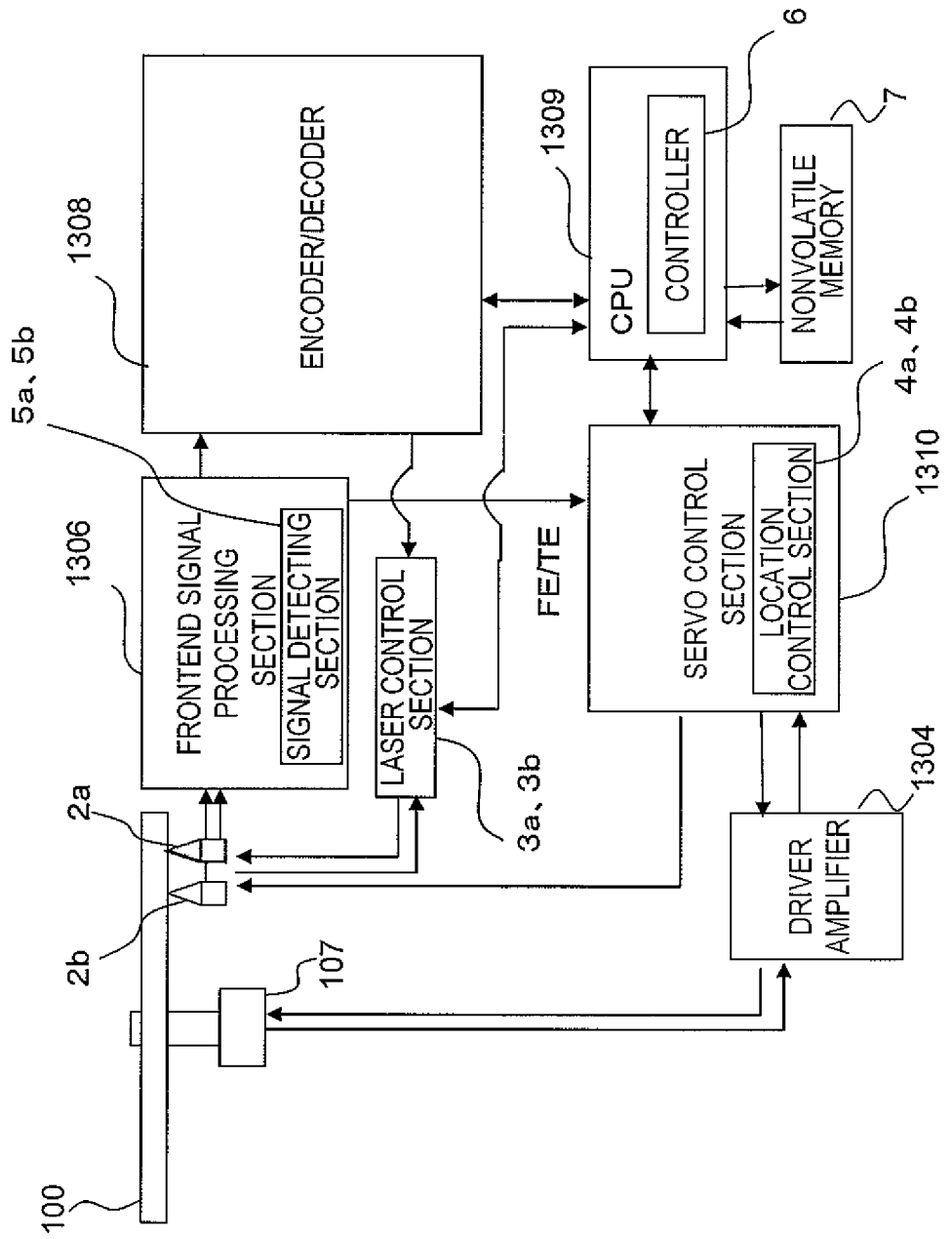
[FIG. 9] Illustrates an exemplary circuit configuration for an optical read/write apparatus according to this embodiment.

In the exemplary configuration shown in FIG. 9, the outputs of the optical heads 2a and 2b are supplied to an encoder/decoder 1308 by way of a frontend signal processing section 1306. In the read mode, the encoder/decoder 1308 decodes the data that is stored on the optical disc 100 based on the signals that have been generated by the optical heads 2a and 2b. In the write mode, on the other hand, the encoder/decoder 1308 encodes the data to generate a signal to be written on the optical disc 100 and outputs the signal to the laser control sections 3a and 3b. In response, the laser control sections 3a and 3b detect the powers of the optical heads 2a and 2b, respectively, and control the powers toward target powers. Furthermore, in the write mode, the laser control sections 3a and 3b control the laser powers of the optical heads 2a and 2b based on the output of the encoder/decoder 1308.

The frontend signal processing section 1306 not only generates read signals based on the outputs of the optical heads 2a and 2b but also generates a focus error signal FE and a tracking error signal TE. The focus error signal FE and the tracking error signal TE are then supplied to the servo control section 1310. In response, the servo control section 1310 gets the motor 107 controlled by a driver amplifier 1304. The servo control section 1310 also gets the positions of objective lenses controlled by respective lens actuators in the optical heads 2a and 2b. Although not shown, the servo control section 1310 also controls the positions of the respective traverse units of the optical heads 2a and 2b. The encoder/decoder 1308, the servo control section 1310, the laser control sections 3a and 3b and all the other components are controlled by a CPU 1309.

The function of the location control sections 4a and 4b shown in FIG. 1 is performed by the servo control section 1310. The function of the signal detecting sections 5a and 5b is performed by the frontend signal processing section 1306. And the function of the controller 6 is performed by the CPU 1309.

<1-2. Operation>

Hereinafter, it will be described how the optical read/write apparatus with such a configuration operates. More specifically, it will be described how a recorded mark that has been left by the optical head 2a for writing is scanned by the optical head 2b for reading (i.e., for verification) to perform a verify operation using this optical read/write apparatus.

Figure 10:
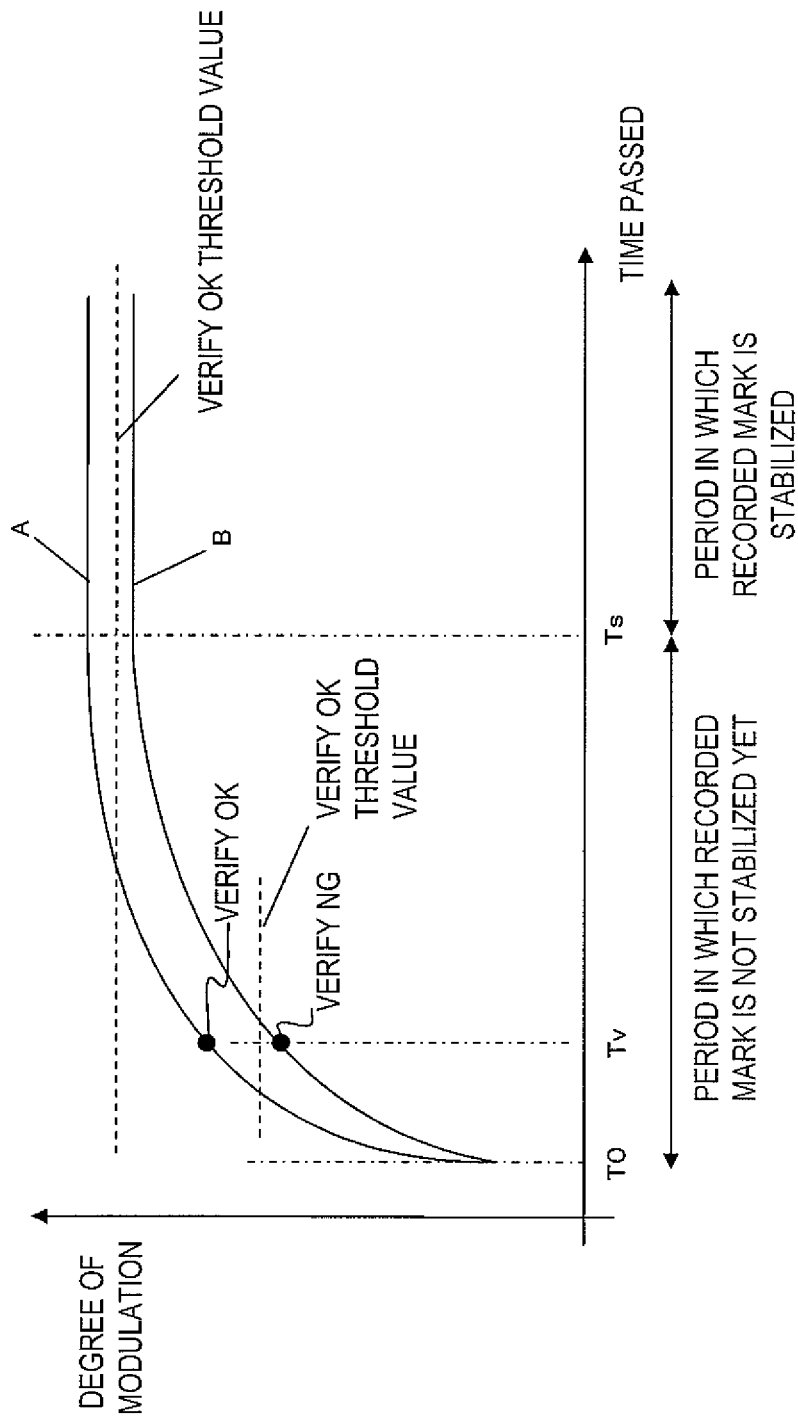
[FIG. 10] A characteristic diagram showing how a detection signal (representing the degree of modulation) for use to make a verify decision changes with time.

FIG. 10 is a graph showing an exemplary relation between the level of a detection signal which is obtained from a recorded mark (and which represents the degree of modulation) and the time t that has passed since a mark recording start time T0. In FIG. 10, shown are two curves A and B representing how the degree of modulation changes with time. In the related art in which the verify operation is not started until the time t that has passed is long enough (t>Ts) to stabilize the recorded mark sufficiently, the recorded mark represented by the curve A is verifiable (such a state will be referred to herein as "verify OK state") but the recorded mark represented by the curve B is not verifiable (such a state will be referred to herein as "verify NG state"). Even if the same optical storage medium is used but if the optical storage medium is irradiated with a light beam under different conditions to record marks there, the passed time dependence of the degree of modulation changes as represented by the curves A and B. Also, even if the optical storage medium is irradiated with a light beam under the same condition, the passed time dependence of the degree of modulation may also change according to the type of the optical storage medium. It should be noted that the time that has passed corresponds to the distance between the write optical head 2a and the read optical head 2b. That is to say, the shorter the distance between the write and read optical heads 2a and 2b, the shorter the time passed.

If the recording film of a rotating optical disc is locally melted by being irradiated with a light beam, the melted portion will be cooled and solidified naturally after the spot of the light beam has left. And such a melted and solidified portion will be an amorphous recorded mark. The state, i.e., the optical properties (such as the refractive index and reflectance), of the recorded mark may change even during, or after, the cooling process. The curves A and B shown in FIG. 10 represent such a variation in the optical properties of a recorded mark with time.

The time it takes to stabilize a recorded mark varies significantly according to the type or property of a recording film that an optical storage medium has. Thus, according to this embodiment, the recording film of an optical storage medium can also be made of even a recording film material with which it will take a very long time (e.g., more than 10 minutes) to stabilize a recorded mark, which is beneficial, too.

According to the present disclosure, when the time t that has passed since the mark recording start time T0 is still not long enough to stabilize the recorded mark, a signal is detected and the decision is made whether the recorded mark is verifiable or not. To make this decision, according to this embodiment, the relation between the time t that has passed since the mark recording start time T0 and a threshold value to make a detection signal level decision (which will be referred to herein as a "decision threshold value") is obtained in advance and stored in a memory.

Figure 11:
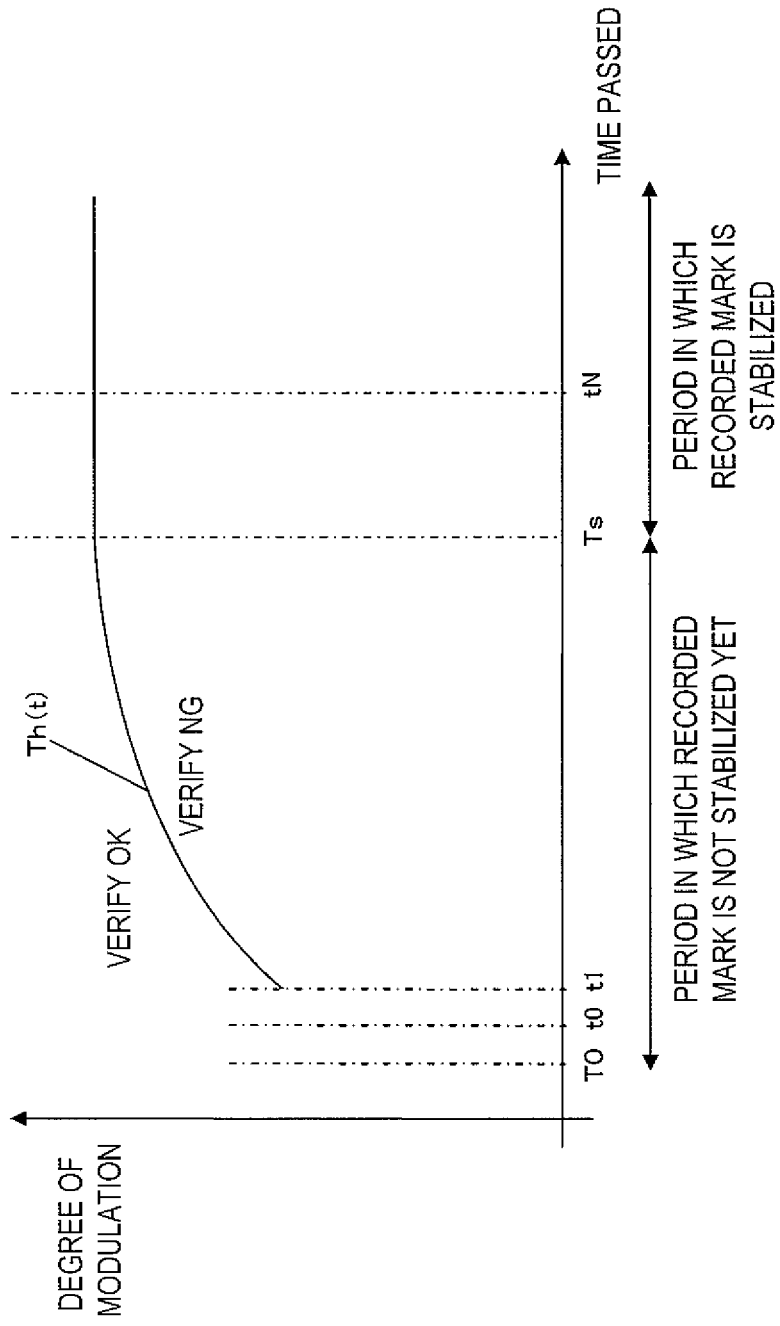
[FIG. 11] A characteristic diagram showing how a decision threshold value for use to make a verify decision changes with time.

The decision threshold value when the time that has passed is t seconds will be represented as Th(t). Examples of Th(t) are shown in FIG. 11. Specifically, if the time t that has passed is 0.01 seconds, the decision threshold value at that time may be represented as Th(0.01). In that case, if the degree of modulation at the time t=0.01 seconds is equal to or greater than Th(0.01), it is the verify OK state. On the other hand, if the degree of modulation at the time t=0.01 seconds is less than Th(0.01), it is the verify NG state.

In a situation where the degree of modulation is adopted as a detection signal, until the recorded mark gets stabilized, the decision threshold value Th(t) tends to increase as the time t passes as shown in FIG. 11. If a verify operation is performed when a certain amount of time t has passed and if the degree of modulation turns out to be equal to or greater than the decision threshold value Th(t), then the decision is made that it is the verify OK state. However, if the degree of modulation turns out to be less than the decision threshold value. Th(t), then the decision is made that it is the verify NG state. That is why the range over the Th(t) curve shown in FIG. 11 is a verify OK range, while the range under the Th(t) curve is a verify NG range. If the relation between the time t that has passed and the decision threshold value Th(t) is known, the verify operation can be performed at any of various times t passed.

Figure 12:
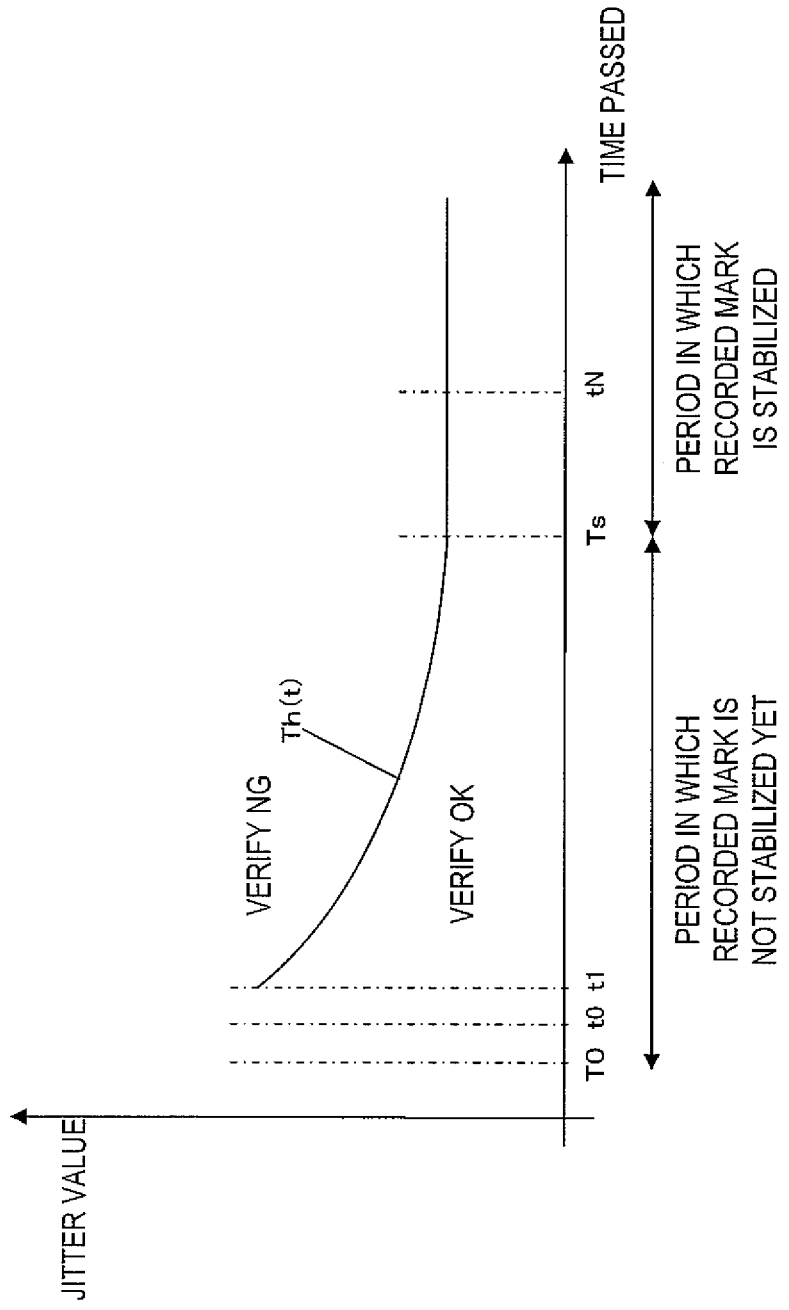
[FIG. 12] A characteristic diagram showing how a detection signal (representing a jitter value) for use to make a verify decision changes with time.

In a situation where the jitter value is adopted as a detection signal, until the recorded mark gets stabilized, the decision threshold value Th(t) tends to decrease as the time t passes as shown in FIG. 12.

Alternatively, the relation between the time t passed and the decision threshold value Th(t) may be represented approximately by a numerical expression. In that case, if a specific amount of time passed is substituted for t included in that numerical expression, the decision threshold value Th(t) can be obtained. Still alternatively, the relation between the time t passed and the decision threshold value Th(t) may also be defined by a table that shows correspondence between one or multiple times t passed and the decision threshold value(s) Th(t) associated with the time(s) t passed. Such a table includes data showing the correspondence between t0, t1, . . . and tN (where t is an integer that is equal to or greater than one) and Th(t0), Th(t1), . . . and Th(tN).

In the example shown in FIG. 11, when t=t0, no valid decision can be made. And a valid decision cannot be made until t=T1 is met. Also, in the example shown in FIG. 11, the time t=tN is longer than Ts. However these are just an example.

If N=1, then a particular time tx passed and the decision threshold value Th(tx) at that time tx are determined automatically. In that case, the verify operation is carried out at that particular time tx passed. In this manner, the time for performing the verify operation may be fixed at such a particular point in time.

The relation between the time t passed and the decision threshold value Th(t) varies according to the type of the storage medium and/or the environmental temperature. That is why even if the time t passed is the same, the decision threshold value at or over which the recorded mark is in the verify OK state may vary according to the type of the given storage medium. For that reason, the relation between the time t passed and the decision threshold value Th(t) is determined in advance according to the type of the storage medium. Once the type of the storage medium that has been loaded into the optical read/write apparatus is recognized, the decision threshold value Th(t) is determined by that type. That is to say, a table of correspondence between the type of a storage medium and its associated decision threshold value Th(t) may be stored in a memory. That memory may be the nonvolatile memory 7 shown in FIG. 1. In performing a verify operation, the decision threshold value Th(t) for use to get the verify operation done is obtained by reference to the table in that memory. The time t passed at which the verify operation is carried out may be either fixed irrespective of, or changed according to, the type of the storage medium. For example, as for a storage medium on which a recorded mark is stabilized in a shorter time than on other storage media, the verify operation may be performed in a shorter time t passed than on other storage media.

Optionally, during the manufacturing process of the optical read/write apparatus, the decision threshold value Th(t) may be obtained for each storage medium and a software program for performing respective processing steps, which begin with determining the decision threshold value and end with carrying out a verify operation, may be installed into the optical read/write apparatus.

The decision threshold value may also be changed according to the writing speed (i.e., how many times the writing speed selected is higher than the normal speed). The reason is that the recording power and the number of revolutions of the disc change with the writing speed, so does the quantity of the energy injected by the light beam into the storage medium as a result. That is to say, the decision threshold value, at or over which the recorded mark is in the verify OK state, changes with the writing speed.

Furthermore, even if multiple different decision threshold values associated with respective types of storage media are not stored in advance in the nonvolatile memory, learning for obtaining such decision threshold values may also be carried out before the write operation is started. Even if the type of the given storage medium is unknown, the decision threshold value, at or over which the recorded mark enters the verify OK state, can also be set before the recorded mark gets stabilized by examining how the detection signal to be actually used to perform the verify operation changes with time.

As Procedure 1, this optical read/write apparatus performs the following preprocessing (learning by test write operation) before starting the write operation. For example, the optical disc drive shown in FIG. 1 makes the write optical head 2a record a mark on the optical disc 1 and then makes the signal detecting section 5b detect the level of the detection signal with respect to the signal that has been read by the read optical head 2b from the recorded mark. In this case, the relative arrangement in which the read optical head 2b is located behind the write optical head 2a may be changed by the location control section 4b so that those two heads are located on the same track as shown in FIG. 5A or that the read optical head 2b is located on a different track from the one on which the write optical head 2a is currently located as shown in FIG. 5B, thereby setting the distance between the write and read optical heads 2a and 2b to be various different values. In this manner, the verify operation can be started in various different amounts of time since a mark started to be recorded. If the level of the detection signal is measured by the signal detecting section 5b with respect to the output signal of the read optical head 2b at multiple different times passed (where t=t0, t1, . . . and tN), the level of the detection signal to be detected from the recorded mark can be measured with respect to the time passed as shown in FIG. 10. That is to say, the passed time dependence of the detection signal level can be obtained. If the conditions for recording a mark (including the power of the light beam, the running velocity of the storage medium and the type of the storage medium) are changed, the decision can be made whether the level of the detection signal is a verify OK level or a verify NG level when the recorded mark gets stabilized. As a result, the passed time dependence of the decision threshold value until the recorded mark gets stabilized (as represented by the curve shown in FIG. 11, for example) can be obtained.

In this embodiment, the decision threshold value which indicates the level of the detection signal that is a verify OK level before the recorded mark gets stabilized is determined as described above along with the distance between the optical head 2a for writing and the optical head 2b for verification at that time passed. And the threshold value and distance thus obtained are stored in a nonvolatile memory of the optical disc drive, for example.

Such preprocessing may be carried out not only before the write operation is started but also just before the apparatus is shipped. If decision threshold values Th(t) have been obtained with respect to various optical storage media by using the apparatus shown in FIG. 1 before the apparatus is shipped, the verify operation can also be carried out before the recorded mark gets stabilized even by using an optical disc drive in which the distance between the write and read optical heads 2a and 2b is fixed. The reason is that as long as the decision threshold value Th(t) is known, the verify operation itself can also be performed even if the time passed since a mark started to be recorded is fixed. The distance between the write and read optical heads 2a and 2b is varied in order to obtain the decision threshold value Th(t).

Next, as Procedure 2, user data is written by the write optical head 2a. Specifically, a mark is recorded on the optical disc 100, and the optical head 2b for verification is separated from the optical head 2a for writing by the distance corresponding to the decision threshold value that has been determined in Procedure 1. Before the recorded mark gets stabilized, the signal is read and the signal detecting section 5b performs a verify operation on the data that has been written. This verify processing is carried out by retrieving, as a criterion for decision, the decision threshold value that has been obtained in Procedure 1 from the nonvolatile memory and using that decision threshold value.

According to this embodiment, even if the write and read optical heads 2a and 2b are located close to each other, the decision can also be made, based on the signal obtained before the recorded mark gets stabilized, whether it is a verify OK state or a verify NG state. As a result, the verify operation can be carried out more quickly than previously.

Although the detection signal index value is supposed to be the degree of modulation in the example described above, any other index value such as an asymmetry value, a β value, a jitter value or iMLSE may also be used. Each of those detection signal index values varies not only with time but also according to the type of the given medium or the environmental temperature as well. It should be noted that iMLSE is an error rate evaluation value to be used in a decoding system which adopts a bit detection method by PRML (partial response maximum likelihood) and is disclosed in Japanese Laid-Open Patent Publication No. 2011-141936, for example.

If a data write operation and a verify operation are sequentially performed using a single optical head, then the verify operation is performed intermittently, not continuously. For example, the verify operation may be performed at an interval of 200 ms, for example. However, the optical read/write apparatus of this embodiment includes the read optical head 2b, and therefore, can perform the verify operation at any arbitrary interval.

Even though the distance between the write and read optical heads 2a and 2b is supposed to be variable in the embodiment described above, the distance between the write and read optical heads 2a and 2b may be fixed as well as described above. Furthermore, the best distance between the write and read optical heads 2a and 2b may be set to be any arbitrary value as long as there is a time left for predicting the result of the verify operation to be performed after the recorded mark gets stabilized based on the detection signal representing a jitter value, an asymmetry value, a β value or the degree of modulation. For instance, in the example shown in FIG. 11, since the time passed t=t0 is not met, the result of the verify operation cannot be predicted with high likelihood, and therefore, the verify operation is performed with the time passed t set to be T1 or more.

<1-3. Effects>

As described above, since the verify operation is carried out according to this embodiment before the recorded mark gets stabilized, the verify operation can be performed more shortly after a mark started to be recorded. That is why even if a write error has occurred for some reason, that error can be detected in a relatively short time and the condition for the write operation can be modified quickly.

If a write error has been spotted as a result of the verify operation, the data that has failed to be written as intended is written all over again on a spare area on the optical storage medium. In the read mode, data including the one that has not been written successfully is replaced with the data that has been written on the spare area. By shortening the interval between recording of a mark and start of the verify operation, the size of the data to be written on a spare area every time a write error occurs can be reduced. If a lot of spare area is to be secured, the area to write user data on should be cut down accordingly. According to this embodiment, however, the size of the data to be written on a spare area every time a write error is sensed can be reduced, and therefore, the spare area of a limited size can be used efficiently.

[Other Embodiments]

Although an embodiment has been described herein as just an example of the technique of the present disclosure, various modifications, replacements, additions or omissions can be readily made on that embodiment as needed and the present disclosure is intended to cover all of those variations. Also, a new embodiment can also be created by combining respective elements that have been described for that embodiment disclosed herein.

Thus, other embodiments will be described below collectively.

In the embodiment described above, the optical storage medium is supposed to be an optical disc. However, the optical storage medium does not have to be an optical disc but may also be an optical tape such as the one shown in FIG. 13, which is a perspective view schematically illustrating a portion of an optical tape 105 on a larger scale. The optical tape 105 of this example may include a base film 204a, a back coating layer 204b that is adhered to the back surface of the base film 204a, and an imprint layer 204c that is supported by the base film 204a. On the upper surface of the imprint layer 204c, lands 204d and grooves 204e have been formed. Although not shown in FIG. 13, a reflective film and a recording material film are stacked over the entire upper surface of the imprint layer 204c. The optical tape 105 is extended in the longitudinal direction L and may have a length of several hundred meters, for example. Its width W may be set within the range of a few millimeters to several centimeters, and its thickness may be within the range of a few micrometers to several ten micrometers.

Figure 13:
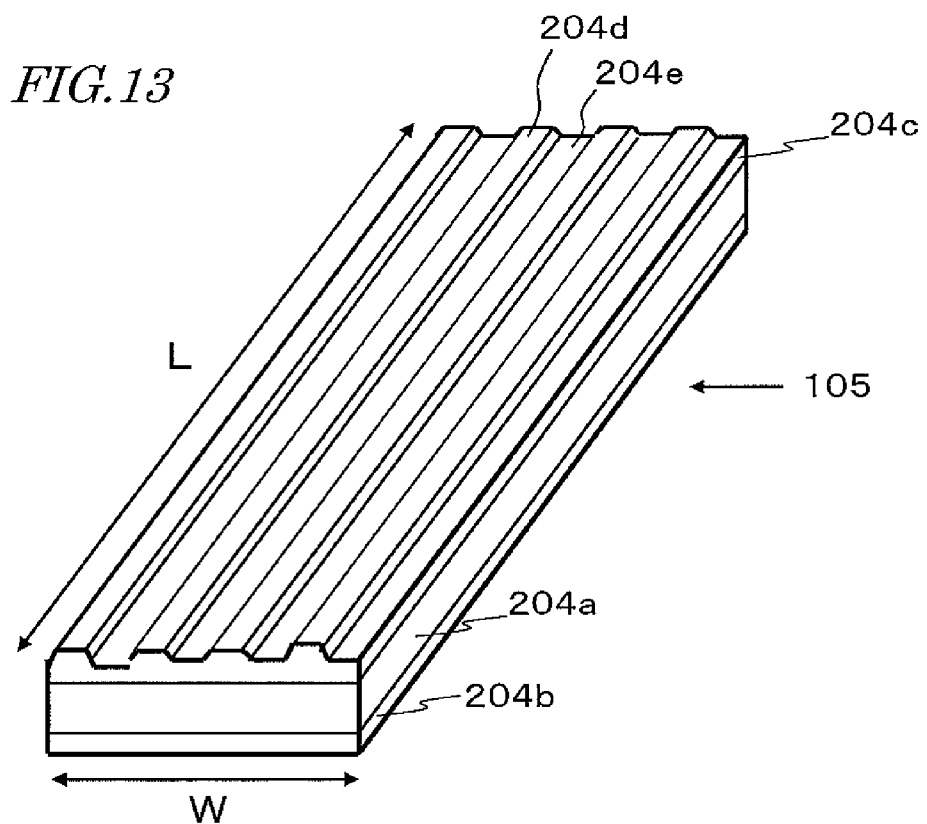
[FIG. 13] A perspective view illustrating an example of an optical tape.

It should be noted that FIG. 13 illustrating the optical tape 105 is not to scale. Actually, the optical tape 105 may have several hundreds, or an even greater number, of lands 204d and grooves 204e. In one embodiment, data is written on either the lands 204d or the grooves 204e.

Optionally, instead of using the optical head for writing and the optical head for reading, a configuration in which a single optical head emits a write light beam and a read light beam may also be adopted. For example, the write light beam and the read light beam may be obtained by getting a light beam that has been emitted from a single light source diffracted, and split into multiple light beams, by an optical element. As long as the decision threshold value Th(t) is known, even such an optical read/write apparatus with a single optical head can also perform the verify operation based on a signal that has been read from a recorded mark yet to be stabilized.

INDUSTRIAL APPLICABILITY

An optical read/write apparatus according to the present disclosure may be used in a bulk data storage system that includes a number of such apparatuses. An embodiment of the present disclosure can be used effectively as a read/write apparatus that not only stores a huge size of data as securely and as reliably as possible but also responds as quickly as possible.

REFERENCE SIGNS LIST 100 optical storage medium
1a, 1b medium
2a, 2b, 2b', 2b" optical head
3a, 3b laser control section
4a, 4b location control section
5a, 5b signal detecting section 6 controller
7 nonvolatile memory
8 buffer memory
10a, 10b track
30 recorded mark
20, 20a, 20b traverse unit
22a, 22b guide
105 optical tape
107 motor
1304 driver amplifier
1306 frontend signal processing section
1308 encoder/decoder
1309 CPU
1310 servo control section
204a base film
204b back coating layer
204c imprint layer
204d, 204e track

The invention claimed is:

1. An optical read/write apparatus comprising:
 an optical head unit which focuses a write light beam and a read light beam onto an optical storage medium and which generates a signal based on the light beam that has been reflected from the optical storage medium; and
 a control section which controls the optical head unit so that the optical head unit records a mark on the optical storage medium by irradiating the optical storage medium with the write light beam and reads the recorded mark on the optical storage medium with the read light beam,
 wherein after having started to record the mark on the optical storage medium by irradiating the optical storage medium with the write light beam and before forming the recorded mark completely, the optical head unit reads the recorded mark on the optical storage medium with the read light beam.

2. The optical read/write apparatus of claim 1, wherein the optical head unit includes
 a first optical head which emits the write light beam; and
 a second optical head which emits the read light beam.

3. The optical read/write apparatus of claim 2, wherein the control section controls the positions of the first and second optical heads so that the relative arrangement of the first and second optical heads is changeable.

4. The optical read/write apparatus of claim 3, wherein the control section changes the relative arrangement of the first and second optical heads so that an interval between a start of recording the mark on the optical storage medium by the first optical head and a readout of the recorded mark by the second optical head is changed according to an environmental temperature or the type of the optical storage medium.

5. The optical read/write apparatus of claim 3, comprising a memory that stores information defining the relative arrangement of the first and second optical heads.

6. The optical read/write apparatus of claim 5, wherein the information defining the relative arrangement is information that indicates correspondence between the relative arrangement, the environmental temperature and the type of the optical storage medium.

7. The optical read/write apparatus of claim 3, wherein the control section determines the relative arrangement of the first and second optical heads by the index value of a detection signal to be obtained by getting the recorded mark on the optical storage medium read by the second optical head.

8. The optical read/write apparatus of claim 7, wherein the index value of the detection signal is a jitter value, an asymmetry value, a β value, iMLSE or the degree of modulation, and
 wherein the control section determines the relative arrangement of the first and second optical heads so that the index value reaches a preset value.

9. The optical read/write apparatus of claim 8, wherein the control section changes the relative arrangement of the first and second optical heads according to the index value of the detection signal after user data has started to be written.

10. The optical read/write apparatus of claim 3, wherein the control section determines the relative arrangement of the first and second optical heads before user data starts to be written.

11. The optical read/write apparatus of claim 2, comprising another optical head.

12. The optical read/write apparatus of claim 3, wherein the control section has a mechanism that moves the first and second optical heads independently of each other.

13. The optical read/write apparatus of claim 2, wherein in the optical head unit, the relative arrangement of the first and second optical heads is fixed.

14. The optical read/write apparatus of claim 1, wherein the optical head unit includes
 a light source which emits light, and
 an optical element which splits the light that has been emitted from the light source into multiple light beams including the write light beam and the read light beam.

* * * * *